(12) United States Patent
Kamiya

(10) Patent No.: US 8,717,481 B2
(45) Date of Patent: May 6, 2014

(54) HEAD-MOUNTED DISPLAY

(75) Inventor: Naohiro Kamiya, Kyoto (JP)

(73) Assignee: Shimadzu Corporation, Kyoto (JP)

(*) Notice: Subject to any disclaimer, the term of this patent is extended or adjusted under 35 U.S.C. 154(b) by 234 days.

(21) Appl. No.: 13/376,909

(22) PCT Filed: May 27, 2010

(86) PCT No.: PCT/JP2010/058964
§ 371 (c)(1),
(2), (4) Date: Dec. 8, 2011

(87) PCT Pub. No.: WO2010/143537
PCT Pub. Date: Dec. 16, 2010

(65) Prior Publication Data
US 2012/0081564 A1 Apr. 5, 2012

(30) Foreign Application Priority Data
Jun. 10, 2009 (JP) .................................. 2009-139045

(51) Int. Cl.
H04N 5/225 (2006.01)
H04N 7/18 (2006.01)
G02B 17/00 (2006.01)

(52) U.S. Cl.
USPC ........... 348/335; 348/115; 348/148; 359/364; 359/366

(58) Field of Classification Search
None
See application file for complete search history.

(56) References Cited

U.S. PATENT DOCUMENTS

| | | | |
|---|---|---|---|
| 4,711,544 A | 12/1987 | Iino et al. | |
| 6,158,866 A | 12/2000 | Gulli et al. | |
| 6,195,206 B1* | 2/2001 | Yona et al. | 359/630 |
| 6,369,779 B1 | 4/2002 | Bartlett | |
| 7,436,568 B1* | 10/2008 | Kuykendall, Jr. | 359/245 |
| 7,733,464 B2* | 6/2010 | David et al. | 356/5.03 |
| 2008/0068825 A1* | 3/2008 | Harris | 362/105 |
| 2008/0180537 A1* | 7/2008 | Weinberg et al. | 348/211.99 |
| 2009/0189830 A1* | 7/2009 | Deering et al. | 345/1.3 |

FOREIGN PATENT DOCUMENTS

EP 0202460 A2 11/1986
(Continued)

OTHER PUBLICATIONS

Japanese Office Action issued in Japanese Application No. 2011-518414 dated Nov. 13, 2012.

*Primary Examiner* — Lin Ye
*Assistant Examiner* — John H Morehead, III
(74) *Attorney, Agent, or Firm* — McDermott Will & Emery LLP (57) ABSTRACT

A head-mounted display (HMD) that enables a wearer to favorably view and recognize images even in a very bright environment, has a HMD in which image display light emitted from a display element is guided to an eye of an observer via a visor, whereby a virtual image of an observed subject is formed in front of the observer. In the HMD, light source devices are a first light source, outputting light of a high intensity, and a second light source, outputting light of a low intensity. The light source devices have a switch to switch between the first and second light sources. The display element, the visor and the second light source are attached to a mount, worn on the head of the observer. The first light source is installed in a moveable body with the observer, and is connected to the mount via light transmission paths.

4 Claims, 9 Drawing Sheets

(56) References Cited

FOREIGN PATENT DOCUMENTS

| | | | |
|---|---|---|---|
| GB | 2336265 | A | 10/1999 |
| JP | 5-7529 | U | 2/1993 |
| JP | 8-54282 | A | 2/1996 |
| JP | 9-188911 | A | 7/1997 |
| JP | 11-327462 | A | 11/1999 |
| JP | 2000-352687 | A | 12/2000 |
| JP | 2001-515150 | A | 9/2001 |
| JP | 2002-023098 | A | 1/2002 |
| JP | 2002-268002 | A | 9/2002 |
| JP | 2005-252591 | A | 9/2005 |
| JP | 2006-085011 | A | 3/2006 |

* cited by examiner

HEAD-MOUNTED DISPLAY

CROSS REFERENCE TO PRIOR APPLICATIONS

This application is a U.S. National Phase application under 35 U.S.C, §371 of International Application No. PCT/JP2010/058964, filed on May 27, 2010 and claims benefit of priority to Japanese Patent Application No. 2009-139045, filed on. Jun. 10, 2009. The International Application was published in Japanese on Dec. 16, 2010 as WO 2010/143537 A1 under PCT Article 21(2). All of these applications are herein incorporated by reference.

TECHNICAL FIELD

The present invention relates to a head-mounted display for providing a virtual image that can be perceived as an image to an observe and in particular to a head-mounted display for providing an image to a helicopter or an airplane pilot.

BACKGROUND

It is useful to use a special camera to acquire visual information on the environment that cannot be acquired by the naked eye so that the visual information that cannot be acquired by the naked eye is used or the visual information by the naked eye is used, depending on the situation. In an application for aiding the operation of a helicopter or an airplane, for example, a helmet with a display (head-mounted display) where a night vision camera is attached to a helmet (mounted body) has been proposed (see Japanese Unexamined Patent Publication H9 (1997)-188911and Japanese Translation of International Unexamined Patent Publication 2001-515150). Such a helmet with a display can display visual information acquired by means of a light-amplifying camera on the helmet visor. As a result, the wearer of the helmet with a display (observer) can clearly see the environment even at night or in similar conditions. A helmet with a display where an infrared camera is attached to a helmet has also been proposed (see Japanese Unexamined Patent Publication H8 (1996)-54282). Such a helmet with a display can display visual information acquired by means of an infrared camera on the helmet visor. Light-amplifying cameras and infrared cameras are generally referred to as night vision cameras, and these terms are used in the present patent.

Here, a display fixed to a helmet is referred to as helmet-mounted display. In addition, a display fixed to a headband (mounted body) is referred to as head-mounted display. Helmet-mounted displays and head-mounted displays are both referred to as HMD (head-mounted display) using the same abbreviation.

HMDs provide the wearer a virtual image (for example, information on speed, direction and altitude) even during the daytime and similar conditions. At this time, it is necessary to allow the wearer to recognize a good image even in the case where it is very bright outside and a large amount of light transmits through the visor, and therefore images having high brightness have been displayed. Concretely, an ultrahigh-intensity CRT (cathode ray tube) has been used as a display element for displaying an image having high brightness. However, the ultrahigh-intensity CRT has such problems that it is heavy and bulky.

Meanwhile, EL elements, which are light and small display elements, and flat panels, such as transmission liquid crystal panels and reflection liquid crystal panels that do not emit light by themselves and use a light source, have been researched, and some of them have been put into practice.

Figure 9:
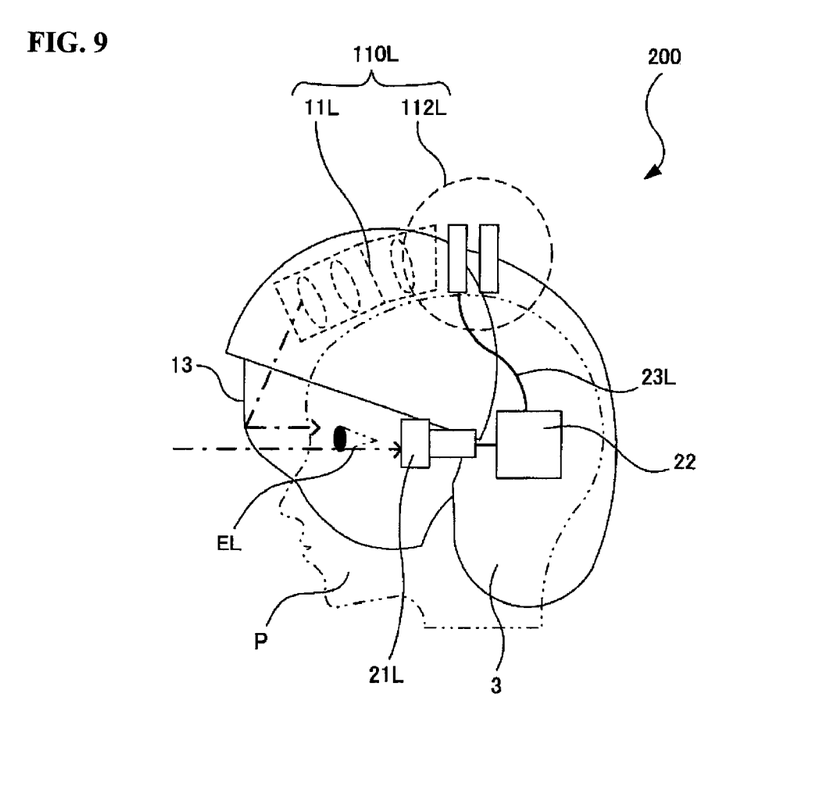
FIG. 9 is a schematic side diagram showing an example of the structure of a helmet with a display using a flat panel.
Figure 10:
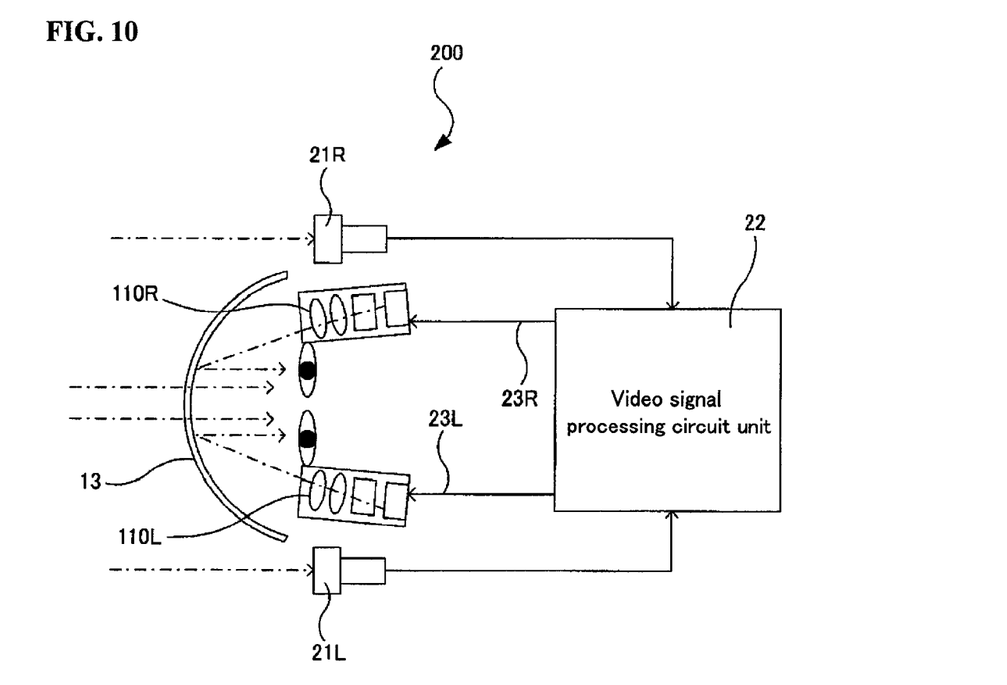
FIG. 10 is a schematic plan diagram showing the structure of the helmet with a display in FIG. 9.

FIG. 9 is a schematic side diagram showing an example of the structure of a helmet with a display using a flat panel, and FIG. 10 is a schematic plan diagram showing the structure of the helmet with a display in FIG. 9.

A helmet with a display 200 is provided with a helmet 3 mounted on the head of a wearer P, a visor 13 placed in front of the wearer P, a night vision camera 21L for the left eye that takes images for the left eye, a night vision camera 21R for the right eye that takes images for the right eye, a display unit 110L for the left eye placed to the upper left of the wearer P, a display unit 110R for the right eye placed to the upper right of the wearer P, a video signal processing circuit unit 22 for controlling the night vision camera 21L for the left eye, the night vision camera 21R for the right eye, the display unit 110L for the left eye and the display unit 110R for the right eye, and a power source, such as a battery, placed in the helmet (not shown).

The helmet 3 is in approximately hemispherical form so as to cover the head of the wearer, and at the same time expose the face.

The visor 13 is in a predetermined form with a curved surface, which is formed of a half mirror or a hologram element. In addition, the visor 13 is supported by the helmet 3 in such a state as being slidable in the up and down directions, and when the visor 13 is lowered, it is located in front of the left eye EL and the right eye ER of the wearer P.

The night vision camera 21L for the left eye and the night vision camera 21R for the right eye have a light-amplifying function, that is, function to amplify the amount of light that enters into the camera, and also function to detect infrared rays radiated from a substance having a high temperature. As a result, an object to be observed can be seen even at night or in similar conditions.

The night vision camera 21L for the left eye and the night vision camera 21R for the right eye are placed to the left and right of the helmet 3, respectively, so as to maintain a certain distance between the cameras in order to see an object to be observed three-dimensionally and at the same time the direction in which lid images are taken is perpendicular to the direction in which the cameras are apart from each other.

Video signals (visual information are inputted from the night vision camera 21L for the left eye and the night vision camera 21R for the right eye into the video signal processing circuit unit 22, which outputs image signals to the display unit 110L for the left, eye and the display unit 1108 for the eye through signal lines 23L and 23R.

In this helmet 200 with a display, light for image display for the left eye emitted from the display unit 110L for the left eye is reflected from the reflecting surface of the visor 13 so as to be lead to the left eye EL of the wearer P, and at the same time light for image display for the right eye emitted from the display unit 110R for the right eye is reflected from the reflecting surface of the visor 13 so as to he lead to the right eye EP of the wearer P, As a result, the wearer P can see a virtual image of the object to be observed three-dimensionally, and at the same time can see the actual things in the environment in the front due to the light that transmits through the visor 13.

Figure 11:
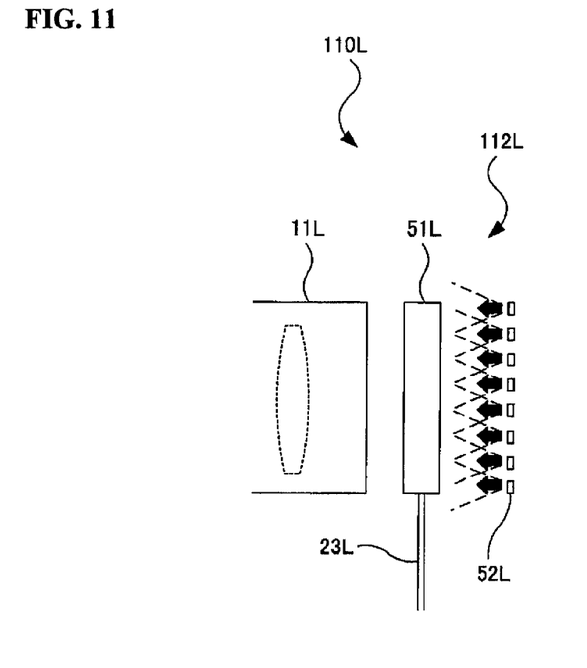
FIG. 11 is a schematic side diagram showing an example of the structure of part of the display unit for the left eye in FIGS. 9 and 10.

FIG. 11 is a schematic side diagram showing an example of the structure of part of the display unit for the left eye in FIGS. 9 and 10.

The display unit 110L for the left eye has a light source 52L, a transmission liquid crystal panel 51L placed in front of the light source 52L, an optical element group 11L placed in front of the transmission liquid crystal panel 51L for projecting a virtual image of the object to be observed, and a signal line 23L for connecting the transmission liquid crystal panel 51L to the video signal processing circuit unit 22.

The transmission liquid crystal panel 51L receives image signals from the video signal processing circuit unit through the signal line 23L so as to generate an image on the flat panel (for example, a one-inch square).

The light source 52L has a number of (65, for example) light emitting diodes. The number of light emitting diodes is arranged two-dimensionally at predetermined intervals. The light emitting diodes emit light to the front. The intensity of light emitted from each light emitting diode is higher at a location closer to the center in front of the light emitting diode (optical axis of the light emitting diode) and lower at a location further a the center. As a result, light is emitted so that the entire surface of the transmission liquid crystal panel 51L is illuminated.

Here, the display unit 110L for the right eye has the same structure as the display unit 110L for the left eye.

Though research has been conducted on helmets 200 with a display as described above in order to increase the intensity of light emitted by the light emitting diodes, images having brightness higher than that of ultrahigh-intensity CRTs cannot be displayed at present, and thus such a problem arises that an image cannot be favorably viewed or recognized in a very bright environment (days with clear weather). Therefore, helmets 200 with a display using a flat panel are limited to indoor use at present.

Though it is possible to supply a large amount of power to the light emitting diodes in order to display an image having high brightness, the light emitting diodes emit heat, and thus the temperature becomes high, and therefore it is not preferable to supply a large amount of power to the light emitting diodes in a helmet 200 with a display that is worn on the head of the wearer P.

Meanwhile, a laser can be used for the light source 52L, instead of light emitting diodes so that an image can be favorably viewed and recognized even in a very bright environment. However, the laser is heavy and bulky, and thus the same problems as with ultrahigh-intensity CRTs arise such that a large load is applied to the head of the wearer P.

Thus, an object of the present invention is to provide a head-mounted display that enables a wearer to favorably view and recognize images even in a very bright environment and imposes a small burden on the head of the wearer.

SUMMARY

The head-mounted display according to the present examples has been made in order to achieve the above-described object has; a light source apparatus; a display element for displaying an image and illuminating the displayed image with light emitted from the light source apparatus so that image display light for showing the image is emitted; and a visor or a combiner placed in front of a wearer's eyes, wherein the image displaying light emitted from the above-described display element is guided to the wearer via the above-described visor or combiner so that a virtual image of an object to be observed is formed in front of the above-described wearer, the above-described light source apparatus is made up of a first light source for emitting light with high intensity and a second light source for emitting light with low intensity, the head-mounted display is provided with a switching unit for switching light between the light emitted from the above-described first light source or the light emitted from the above-described second light source, the above-described display element, visor or combiner and the second light source are attached to a wearable unit worn on the head of the wearer, and the above-described first light source is attached to a vehicle which the wearer gets in and is connected to the wearable unit through an optical transmission path.

In accordance with the head-mounted display according to the present examples, the light source apparatus is made up of a first light source for emitting light with high intensity and a second light source for emitting light with low intensity. The first light source is attached to a vehicle, and therefore the wearable unit can be made light and small. Meanwhile, the second light source is attached to the wearable unit, but it emits light with low intensity, and therefore the wearable unit can be made light and small.

In addition, the light can be switched between the light emitted from the first light source and the light emitted from the second light source. Thus, in a very bright environment, light is emitted from the first light source so that an image can be favorably viewed and recognized. Meanwhile, at night or in similar conditions, light is emitted from the second light source so that an image can be favorably viewed and recognized.

As described above, the head-mounted display according to the present examples enables a wearer to favorably view and recognize images even in a very bright environment, and imposes a small burden on the head of the wearer.

In the above-described invention, the above-described wearable unit may have a night vision camera, the above-described display element may display the above-described image on the basis of a video signal from the above-described night vision camera, and the above-described first light source may he removed from the above-described wearable unit.

Here, the night vision camera includes a light amplifying camera, an infrared ray camera and the like.

In the case where the vehicle functions abnormally (for example, in the case where a helicopter makes an emergency landing) and the wearer gets out of the vehicle and walks around outside, the wearable unit can be detached from the vehicle when the outside is bright. At this time, the outside can be viewed, and recognized because of the brightness in the environment even if the wearable unit does not operate, that is to say there are no night vision cameras. Meanwhile, at night or in similar conditions, the wearable unit is detached from the vehicle, which naturally means to remove the first light source from the wearable unit. At this time, the second light source remains on the wearable body, and the outside can be viewed and recognized by using the image from the night vision camera even at night or in similar conditions. Here, not only an image based on the light from the first light source but also an image based on the light from the second light source can be favorably viewed and recognized at night or in similar conditions.

As described above, the head-mounted display according to the present examples does not cause a problem even in the case where the vehicle functions abnormally.

In addition, in the above-described invention, the above-described first light source may be a laser light source, a halogen lamp, an ultrahigh pressure mercury lamp or a metal halide lamp, and the above-described second light source may be a light emitting diode or a miniature bulb.

Furthermore, in the above-described invention, the above-described first light source may emit light of 3000 cd or higher, for example, and the above-described second light source may emit light of 100 cd or higher and 200 cd or lower, for example.

DETAILED DESCRIPTION

In the following, examples of the present invention are described in reference to the drawings. Here, the present invention is not limited to the below-described examples, and a number of variations can of course be included as long as the gist of the present invention is not deviated from.

Figure 1:
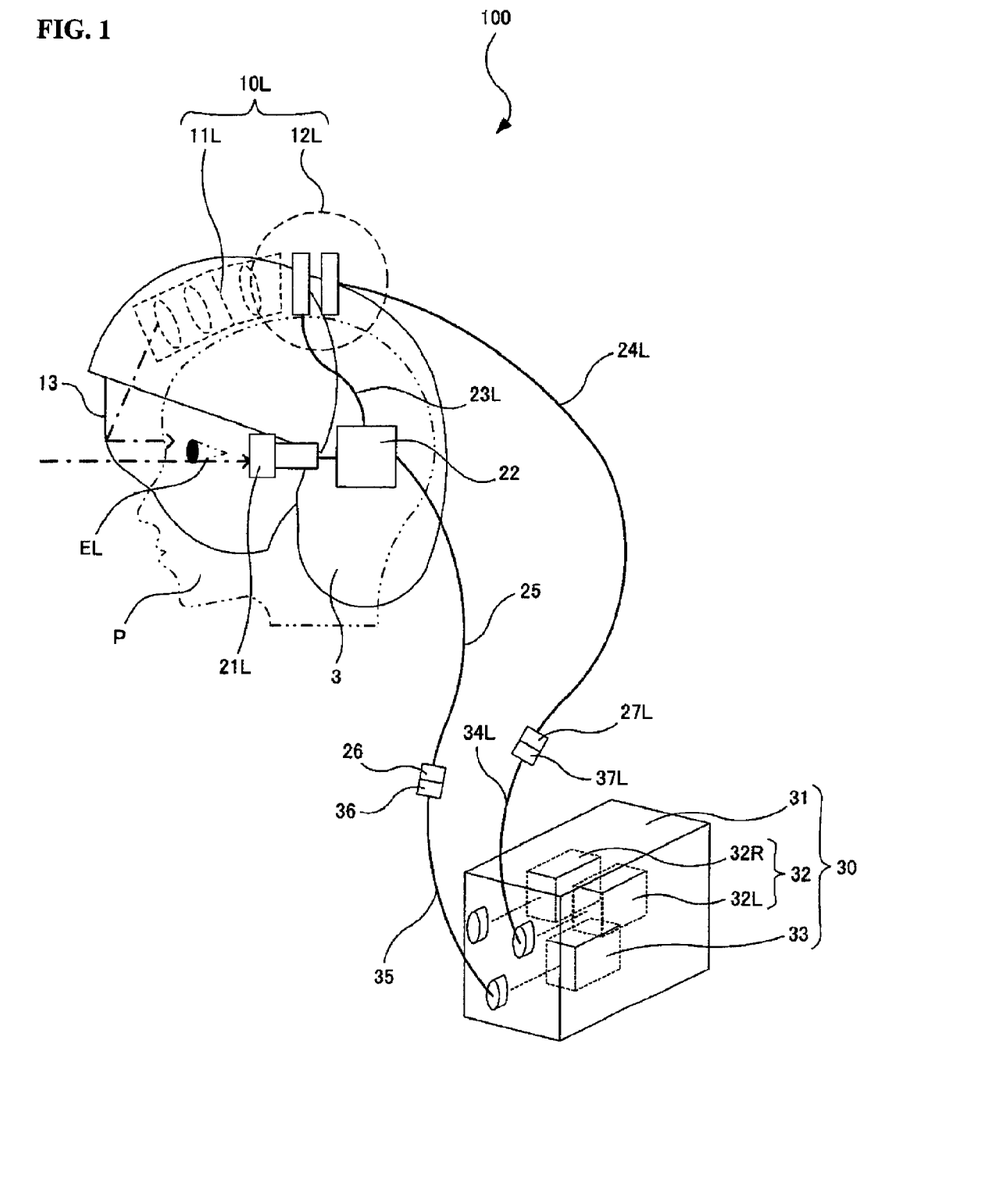
FIG. 1 is a schematic side diagram showing an example of the structure of the helmet with a display according to an example.
Figure 2:
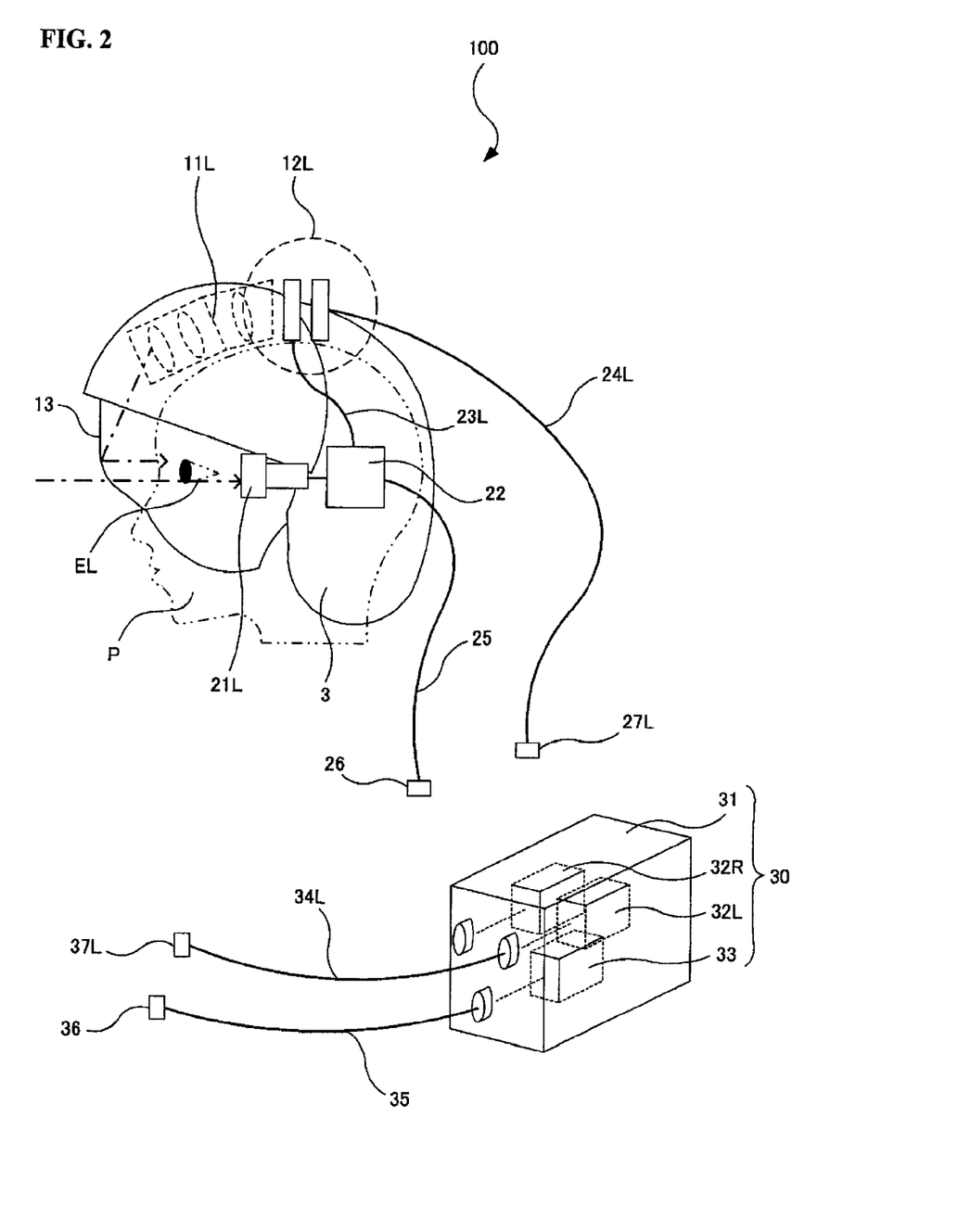
FIG. 2 is a side diagram showing the helmet with a display in FIG. 1 in another state.

FIG. 1 is a schematic side diagram showing an example of the structure of the helmet with a display (head-mounted display) according to the present example. FIG. 2 is a side diagram showing the helmet with a display in FIG. 1 in another state. Here, optical fibers for the right eye are omitted in order to make the diagram easier to understand. In addition, the same symbols are attached to the same components in the helmet 200 with a display.

A helmet 100 with a display is provided with: a helmet (wearable unit) 3 worn on the head of a wearer P; a visor 13 placed in front of the wearer P; a night vision camera 21L for the left eye placed on the left side of the helmet 3 for capturing images for the left eye; a night vision camera 21R for the right eye placed on the right side of the helmet 3 for capturing images for the right eye; a display unit 10L for the left eye placed in the upper left area of the wearer P; a display unit 10R for the right eye placed in the upper right area of the wearer P; a video signal processing circuit it 22 for controlling the night on camera 211, for the left eye, the night vision camera 21R for the right eye, the display unit 10L for the left eye and the display unit 10R for the right eye; a power supply unit, such as a battery (not shown) placed on the helmet 3; a display image signal generating apparatus 30 placed in the cockpit of a helicopter (vehicle); optical fiber groups (light transmission paths) 24 and a signal line 25.

One end of the signal line 25 is connected to the video signal processing circuit unit 22, and the other end is connected to a connector 26. The signal line 25 is in a tube form having a diameter of 2 mm and a length of 10 m, for example.

The optical fiber groups 24 are made up of optical fibers 24L for the left eye and the optical fibers for the right eye (not shown). The optical fibers 24L for the left eye and the optical fibers for the right eye are in a tube form having a diameter of 2 mm and a length of 10 m, for example, and can transmit light in the direction of the axis so that light that has entered from one end passes through and is emitted from the other end.

In addition, one end of the optical fibers 24L for the left eye is connected to the display unit 10L for the left eye, and at the same time he other end is connected to the connector 27L for the left eye. In addition, one end of the optical fibers for the right eye is connected to the display unit 10R for the right eye, and at the same time the other end is connected to a connector for the right eye (not shown).

Video signals (visual information) are inputted from the night vision. camera 21L for the left eye and the night vision camera 21R for the right eye into the video signal processing circuit unit (switching unit) 22, which outputs image signals to the display unit 10L for the left eye and to display unit 10R for the right eye through the signal lines 23L and 23R, and at the same time switches the light so that light is emitted from the second light sources 52L and 52R when the display image signal generating apparatus 30 is removed, as shown in FIG. 2 and described below. That is to say, the second light sources 52L and 52R do not emit light when the display image signal generating apparatus 30 is attached as shown in FIG. 1. The display image signal generating apparatus 30 has a housing 31, is provided with a first light source 32 and a video signal processing unit 33 for controlling the display unit 10L for the left eye and the display unit 10R for the right eye inside the housing 31, and is provided with optical fiber groups (light transmission paths) 34 and a signal line 35 outside the housing 31.

One end of the signal line 35 is connected to a video signal processing unit 33, and at the same time the other end is connected to a connector 36. The signal line 25 is in a tube form having a diameter of 2 mm and a length of 10 m, for example. In addition, the connector 36 is removable from the connector 26 (see FIGS. 1 and 2).

The first light source 32 is made of a laser light source 32L for the left eye and a laser light source 32R for the right eye.

The optical fiber groups 34 are made of optical fibers 34L for the left eye and optical fibers for the right eye (not shown). The optical fibers 34L for the left eye and the optical fibers for the right eye are in tube form having a diameter of 2 mm and a length of 10 m, for example, and can transmit light in the direction of the axis so that light that has entered one end passes through and is emitted from the other end.

One end of the optical fiber 34L for the left eye is connected to the laser light source 32L for the left eye, and at the same time the other end is connected to the connector 37L for the left eye. In addition, the connector 37L for the left eye is removable from the connector 27L for the left eye (see FIGS. 1 and 2).

In addition, one end of the optical fiber for the right eye is connected to the laser light source 32R for the right eye, and at the same time the other end is connected to the connector for the right eye (not shown). In addition, the connector for the right eye is removable from the connector for the right eye.

The video signal processing unit 33 outputs image signals (for example, latitudinal information, longitudinal information, and altitudinal information) to the video signal processing circuit unit 22 through the signal lines 25 and 35, and at the same time controls the first light source 32 so that light is emitted from the first light source 32 when the display image signal generating apparatus 30 is attached as shown in FIG. 1. As a result, light from the laser light source 32L for the left eye enters into the display unit 10L for the left eye through the optical fibers 24L and 34L for the left eye, and at the same time light from the laser light source 32R for the right eye enters into the display un 10R for the right eye through the optical fibers for the right eye when the display image signal generating apparatus 30 is attached.

Figure 3:
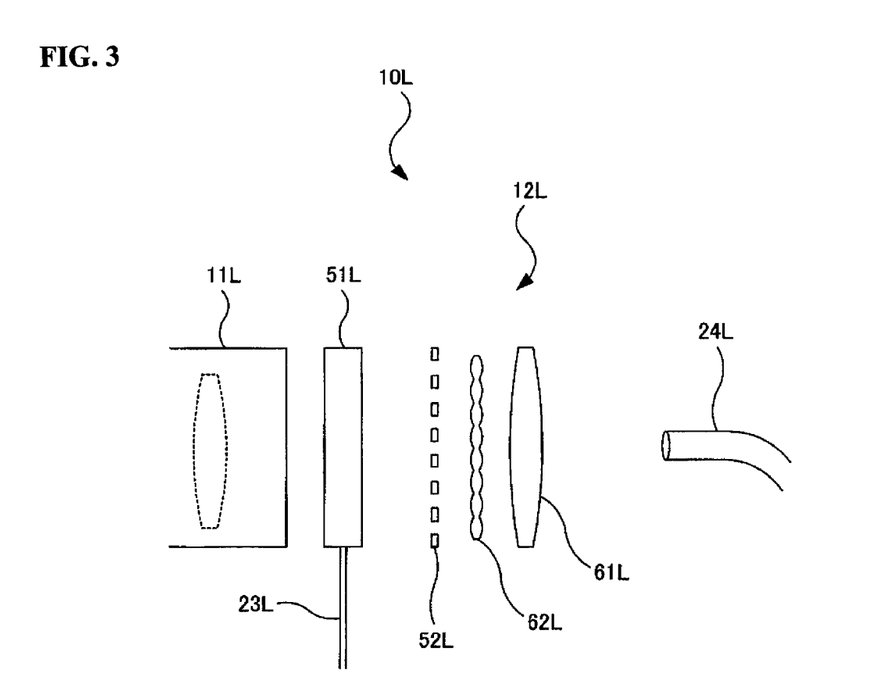
FIG. 3 is a schematic side diagram showing an example of the structure of part of the display unit for the left eye in FIGS. 1 and 2.

FIG. 3 is a schematic side diagram showing an example of the structure of part of the display unit for the left eye in FIGS. 1 and 2.

The display unit 10L for the left eye has a second light source 52L; a transmission liquid crystal panel 51L placed in front of the second light source 52L; an optical element group 11L for projecting a virtual image of an object to be observed placed in front of the transmission liquid crystal panel 51L; a signal line 23L for connecting the transmission liquid crystal panel 51L to the video signal processing circuit unit 22; a lens 61L placed in front of one end of the optical fibers 24L for the left eye; and a lens array 62L placed in front of the lens 61L.

Figure 4:
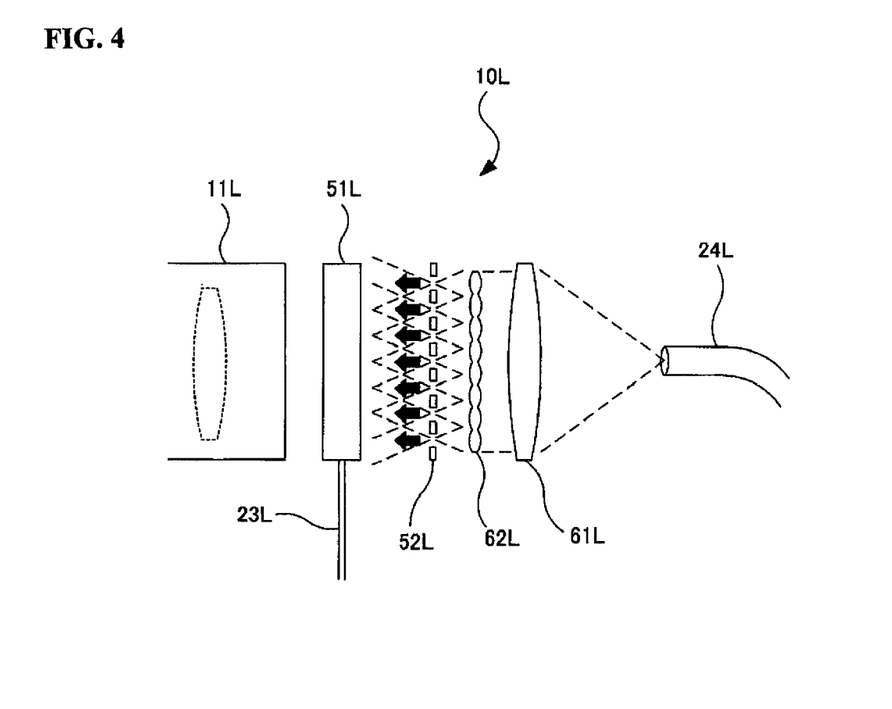
FIG. 4 is a side diagram showing the display unit for the left eye when light is emitted from the second light source.

The second light source 52L has a number of (65, for example) light emitting diodes. The number of light emitting diodes is arranged in a matrix at predetermined intervals. Each light emitting diode emits light to the front. As a result, the entire surface of the transmission liquid crystal panel 51L is illuminated when light is emitted from the second light source 52L, as shown in FIG. 4, on the basis of the control signal from the video signal processing circuit unit 22.

The lens 61L makes the light flux emitted from one end of the optical fiber 24L for the left eye parallel light so that parallel light is emitted to the front.

The lens array 62L divides the parallel light into a number of small light fluxes so that that a number of small light fluxes are emitted to the front. At this time, each small light flux converges once at the focal point between a gap between light emitting diodes, and after that diffuses.

Figure 5:
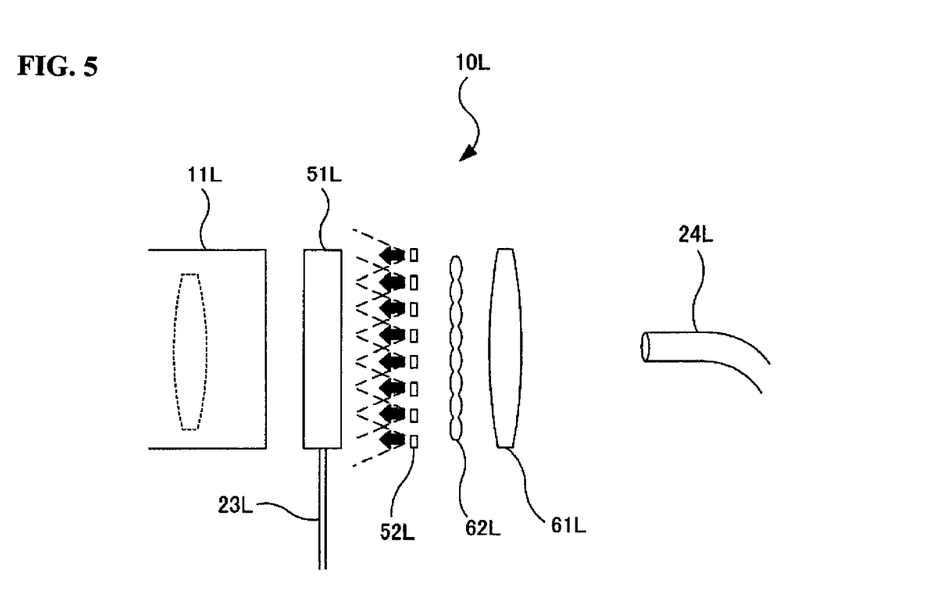
FIG. 5 is a side diagram showing the display unit for the left eye when light, is emitted from the first light, source.

As a result, the entire surface of the transmission liquid crystal panel 51L is illuminated with light emitted from the first light source 32L, as shown in FIG. 5, on the basis of the control signal from the video signal processing unit 33. Here, a lens may he provided at the end of the optical fiber 24L for the left eye in order to adjust the angle at which the light is emitted.

In addition, the display unit 10R for the right eye has the same structure as the display unit 10L for the left eye.

Next, an example of the application of the helmet 100 with a display according to the present invention is described.

(1) During the Operation of a Helicopter

Since the display image signal generating apparatus 30 is attached as shown in FIG. 1, the video signal processing unit 33 outputs a image signal to the video signal processing circuit unit 22 through the signal lines 25 and 35, and at the same time allows the first light source 32 to emit light. At this time, light is emitted from the first light source 32 even in a very bright environment, and thus the image can be favorably viewed and recognized.

(2) When Getting Out of a Helicopter at Night

When the helicopter functions abnormally, the wearer P removes the display image signal generating apparatus 30, as shown in FIG. 2, in order to get out from the helicopter. That is to say, the connector 36 and the connector 26 are disengaged from each other, the connector 37L for the left eye and the connector 27L for the left eye are disengaged from each other, and the connector for the right eye and the connector for the right eye are disengaged from each other.

As a result, video signals are inputted from the night vision camera 21L for the left eye and the night vision camera 21R for the right eye into the video signal processing circuit unit 22, which outputs image signals to the display unit 10L for the left eye and the display unit 10R for the right eye through the signal lines 23L and 23R, and at the same time outputs a control signal for allowing light to tie emitted from the second light sources 52L and 52R because the display image signal generating apparatus 30 is removed.

As a result, an image of the environment can be viewed and recognized by the night vision camera 21L for the left eye and the night vision camera 21R for the right eye even at night and in similar conditions. Since it is at night or in similar conditions, not only an image on the basis of light from the first light source 32 but also an image on the basis of light from the second light source 52L can be favorably viewed and recognized.

(3) When Getting Out of a Helicopter During Daytime

When a helicopter functions abnormally the wearer P removes the display image signal generating apparatus 30, as shown in FIG. 2, in order to get out of the helicopter. That is to say, the connector 36 and the connector 26 are disengaged from each other, the connector 37L for the left eye and the connector 27L for the left eye are disengaged from each other, and the connector for the right eye and the connector for the right eye are disengaged from each other.

At this time, the environment is bright, and thus an image can be viewed and recognized even though the helmet 100 with a display does not operate, that is to say the night vision camera 21L and the night vision camera 21R for the right eye are not attached.

As described above, the helmet 100 with a display according to the first embodiment can allow an image to be favorably viewed and recognized even when the environment is very bright, and in addition imposes a small burden on the head of the wearer P. Furthermore, no problem arises even in the case where the helicopter functions abnormally.

Figure 6:
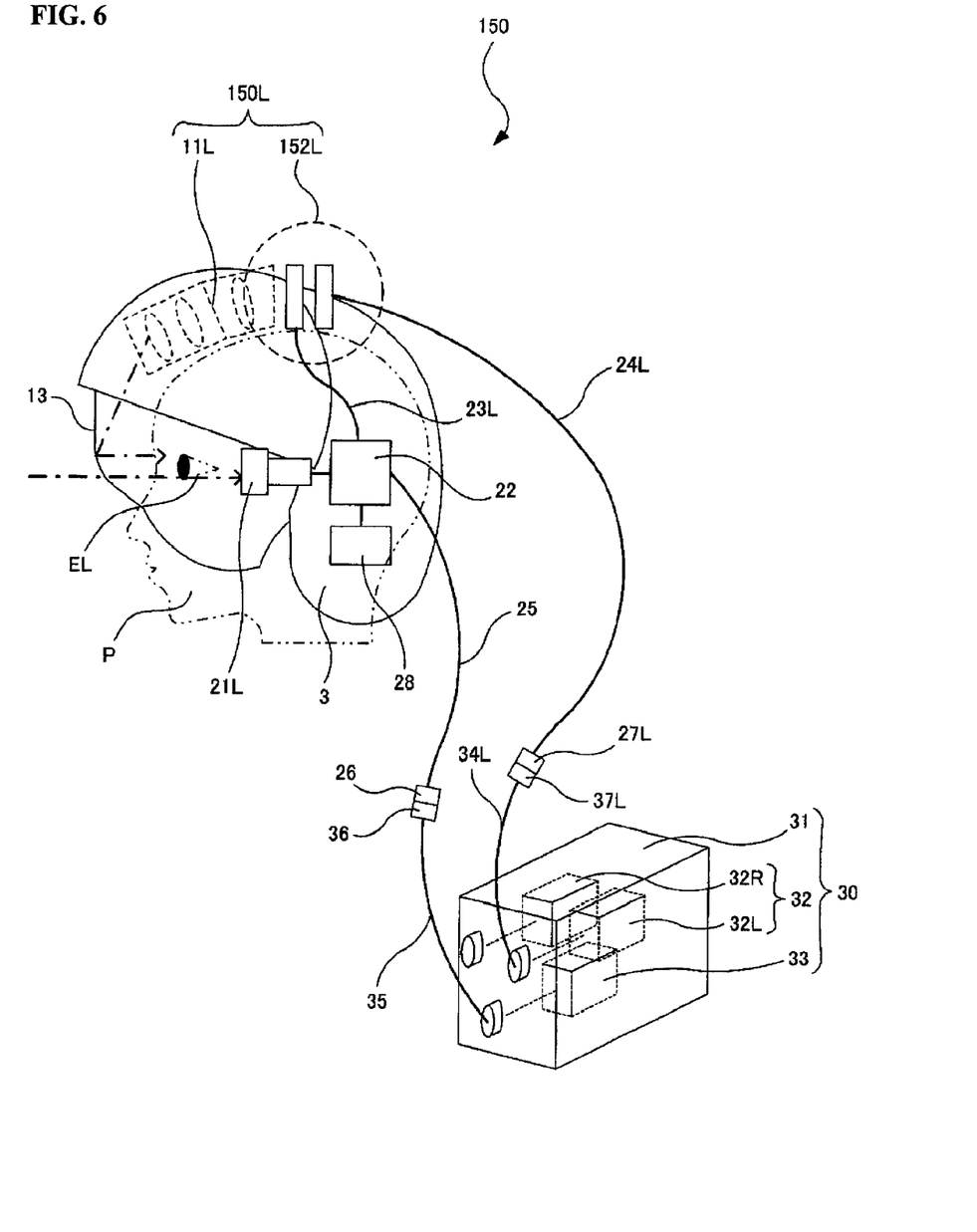
FIG. 6 is a schematic side diagram showing another example of the helmet with a display.

FIG. 6 is a schematic side diagram showing another example of the structure of the helmet with a display. Here, the same symbols are attached to the same components as in the helmet 100 with a display. Unlike the above described helmet 100 with a display; the helmet 150 with a display according to the present example is provided with a switch (switching unit) 28 for switching the light between light emitted from the first light source 32 or light emitted from the second light sources 52L and 52R.

The helmet 150 with a display is provided with: a helmet 3 worn on the head of a wearer P; a visor 13 placed in front of the wearer P; a night vision camera 21L for the left eye placed on the left side of the helmet 3 for capturing images for the left eye; a night vision camera 21R for the right eye placed on the right side of the helmet 3 for capturing images for the right eye; a display unit 10L for the left eye placed in the upper left area of the wearer P; a display unit 10R for the right eye placed in the upper right area of the wearer P; a video signal processing circuit unit 22 for controlling the night vision camera 21L for the left eye, the night vision camera 21R for the right eye, the display unit 10L for the left eye and the display unit 10R for the right eye; a power supply unit, such as a battery (not shown), placed in the helmet 3; a switch (switching unit) 28 placed on the left side of the helmet 3; a display image signal generating apparatus 30 placed in the cockpit of a helicopter (vehicle); optical fiber groups (light transmission paths) 24; and a signal line 25.

The switch 28 outputs a control signal to the video signal processing circuit unit 22 on the basis of the input operation by the wearer P. As a result, the wearer P can switch the light between light emitted from the first light source 32 or light emitted from the second light sources 52L and 52R.

On the basis of the control signal from the switch 28, video signals are inputted from the night vision camera 21L for the left eye and the night vision camera 21R for the right, eye into the video signal processing circuit unit 22, which outputs video signals to the display unit 10L for the left eye and the display unit 10R for the right eye through the signal lines 23L and 23R, and at the same time switches the light from the light emitted from the first light source 32 to the light emitted from the second light sources 52L and 52R.

On the basis of the control signal from the switch 28, the video signal process unit 33 outputs video signals (latitudinal information, longitudinal information and altitudinal information, for example) to the video signal processing circuit unit 22 through the signal lines 25 and 35, and at the same time switches the light from the light, emitted from the second light sources 52L and 52R to the light emitted from the first light source 32.

Figure 7:
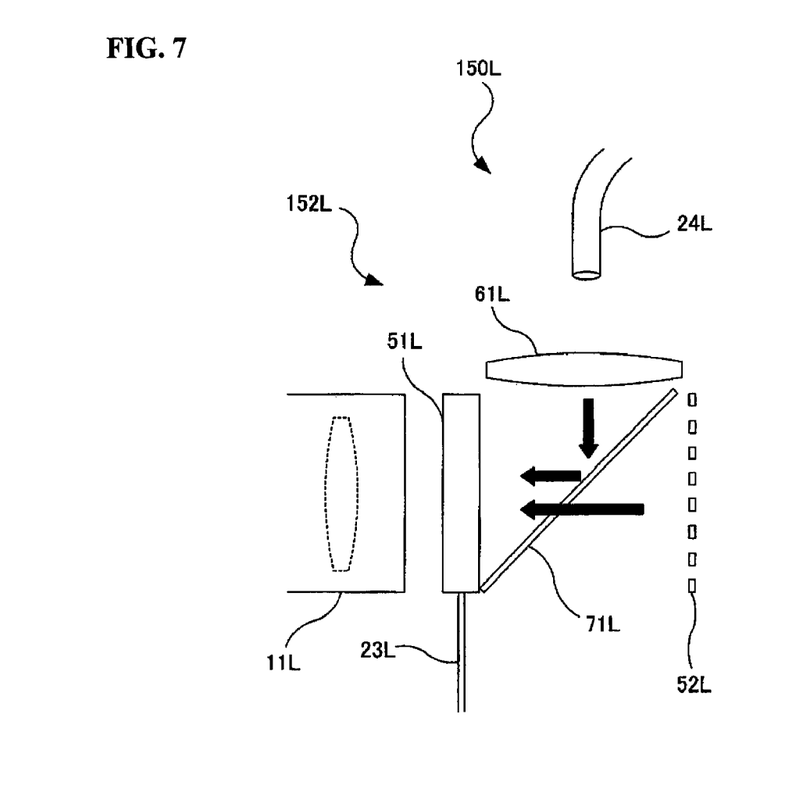
FIG. 7 is a schematic side diagram showing an example of the structure of part of the display unit for the left eye in FIG. 6.

FIG. 7 is a schematic side diagram showing an example of the structure of part of the display unit for the left eye in FIG. 6.

The display unit 150L for the left eye has a second light source 52L; a transmission liquid crystal panel 51L placed in front of the second light source 52L; an optical element group 11L for projecting a virtual image of an object to be observed placed in front of the transmission liquid crystal panel 51L; a signal line 23L for connecting the transmission liquid crystal panel 51L to the video signal processing circuit unit 22; a lens 61L placed in front of one end of the optical fibers 24L for the left eye; and a wavelength selecting mirror 71L is surrounded by the transmission liquid crystal panel 51L, the lens 61L and the second light source 52L.

The wavelength selecting mirror 71L reflects light of which the wavelength is shorter than the borderline wavelength, and at the same time transmits light of which the wavelength is longer than the borderline wavelength. Here, the wavelength selecting mirror 71L may be a half mirror.

As a result, light from the second light source 52L transmits through the half mirror 71L so that the entire surface of the transmission liquid crystal panel 51L is illuminated when light of which the wavelength is longer than the borderline wavelength is emitted from the second light source 52L on the basis of the control signal from the video signal processing circuit unit 22.

Meanwhile, light from the first light source 32L is reflected from the half mirror 71L so that the entire surface of the transmission liquid crystal panel 51L is illuminated in the case where light of which the wavelength is shorter than the borderline wavelength is emitted from the first light source 32L on the basis of the control signal from the video signal processing unit 33.

Next, an example of the application of the helmet 150 with a display is described.

(1) During the Operation of a Helicopter at Night

The wearer P uses the switch 28 so as to switch the light from the light emitted from the first light source 32L to the light emitted from the second light sources 52L and 52R at night or in similar conditions.

As a result, video signals are inputted from the night vision camera 21L for the left eye and the night vision camera 21R for the right eye to the video signal processing circuit unit 22, which outputs video signals to the display unit 10L for the left eye and the display unit 10R for the right eye through the signal lines 23L and 23R, and at the same time emits light, from the second light source 52L and 52R.

Thus, an image of the environment can be viewed and recognized by means of the night vision camera 21L for the left eye and the night vision camera 21R for the right eye even at night or in similar conditions. Since it is at night or in similar conditions, even an image on the basis of light from the second light source 52L can be favorably viewed and recognized instead of an image on the basis of light from the first light source 32.

(2) During the Operation of a Helicopter During Daytime

Since the environment is very bright, the wearer P uses the switch 28 so as to switch the light from the light emitted from the second light sources 52L and 52R to light emitted from the first light source 32.

As a result, the video signal processing unit 33 outputs an image signal to the video signal processing circuit unit 22 through the signal lines 25 and 35, and at the same time emits light from the first light source 32.

Thus, an image can be favorably viewed and recognized even when the environment is very bright by means of light emitted from the first light source 32.

(3) When Getting Out of a Helicopter at Night

When the helicopter functions abnormally, the wearer P removes the display image signal generating apparatus 30, as shown in FIG. 2, in order to get out from the helicopter. That is to say, the connector 36 and the connector 26 are disengaged from each other, the connector 37L for the left eye and the connector 27L for the left eye are disengaged from each other, and the connector for the right eye and the connector for the right eye are disengaged from each other.

In addition, the wearer P uses the switch 28 so as to switch the light from light emitted from the first light source 32 to light emitted from the second light source 52L.

As a result, video signals are inputted from the night vision camera 21L for the left eye and the night vision camera 21R for the right eye into the video signal processing circuit unit 22, which outputs image signals to the display unit 10L for the left eye and the display unit 10R for the right eye through the signal lines 23L and 23R, and at the same time emits light from the second light sources 52L and 52R.

As a result, an image of the environment can be viewed and recognized by the night vision camera 21L for the left eye and the night vision camera 21R for the right eye even at night and in similar conditions. Since it is at night or in similar conditions, not only an image on the basis of light from the first light source 32 but also an image on the basis of light from the second light source 52L can be favorably viewed and recognized.

(4) When Getting Out of a Helicopter During Daytime

When a helicopter functions abnormally, the wearer P removes the display image signal generating apparatus 30, as shown in FIG. 2, in order to get out of the helicopter. That is to say, the connector 36 and the connector 26 are disengaged from each other, the connector 37L for the left eye and the connector 27L for the left eye are disengaged from each other, and the connector for the right eye and the connector for the right eye are disengaged from each other.

At this time, the environment is bright, and thus an image can be viewed and recognized even though the helmet 100 with a display does not operate, that is to say, the night vision camera 21L and the night vision camera 21R for the right eye are not attached.

As described above, the helmet 150 with a display according to the second embodiment can allow an image to be favorably viewed and recognized even when the environment is very bright, and in addition imposes a small burden on the head of the wearer P. Furthermore, no problem arises even in the case where the helicopter functions abnormally.

(1) Though the structure of the display unit 10L for the left eye in the above-described helmet 100 with a display has a transmission liquid crystal panel 51L, the structure may have a reflection liquid crystal panel.

Figure 8:
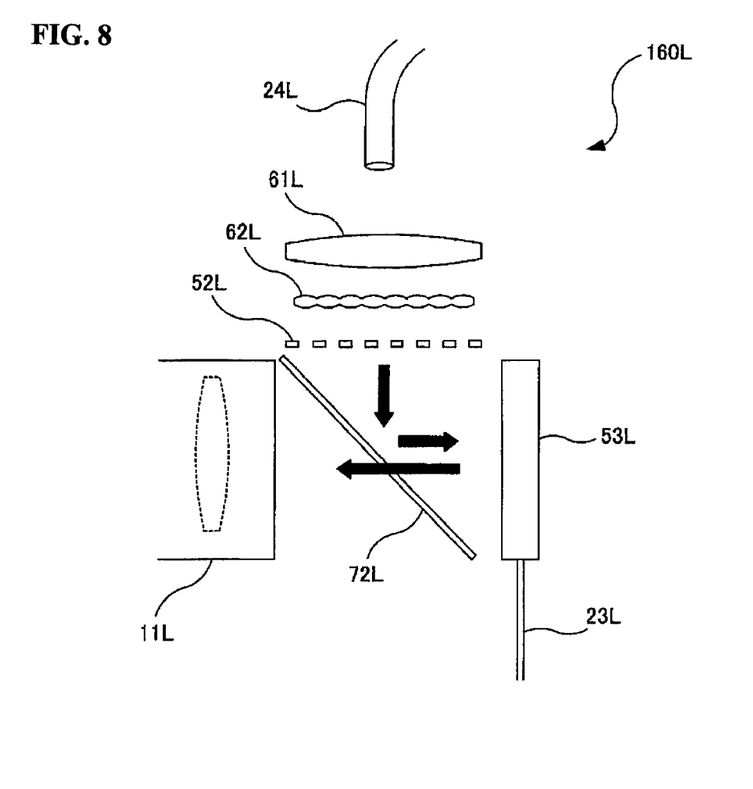
FIG. 8 is a schematic side diagram showing an example of the structure of part of another display unit for the left eye.

FIG. 8 is a schematic side diagram showing an example of the structure of part of a display unit for the left eye.

The display unit 160L for the left eye has: a reflection liquid crystal and 53L; an optical element group 11L placed in front of the reflection liquid crystal panel 53L for projecting a visual image of an object to be seen; a signal line 23L for connecting the reflection liquid crystal panel 53L to he video signal processing circuit unit 22; a second light source 52L; a lens 61L placed in front of the end of the optical fiber 24L for the left eye; a lens array 62L placed in front of the lens 61L; and a polarized light, selecting mirror 72L surrounded by the reflection liquid crystal panel 53L, the optical element group 11L and the second light source 52L.

The polarized light selecting mirror 72L reflects light that has been polarized in a predetermined direction, and at the same time transmits light that has not been polarized in the predetermined direction. Here, the polarized light selecting mirror 72L may be a polarizing prism.

(2) Though image display light is reflected from the reflective surface on the visor 13 so as to be led to the eye E of the wearer P in the structure of the above-described helmet 100 with a display; the structure may be provided with a combiner, such as a half mirror, placed in front of the eye E of the wearer P so that image display light is reflected from the reflective surface of the combiner so as to be led to the eye E of the wearer P.

The present invention can be applied to head-mounted displays for providing a virtual image that can be viewed and recognized by the wearer.

The invention claimed is:

1. A head-mounted display, comprising:
    a light source apparatus;
    a display element displaying an image and illuminating the displayed image with light emitted from the light source apparatus so that image display light showing the image is emitted; and
    at least one of a visor or a combiner placed in front of a wearer's eyes, wherein
    the image displaying light emitted from said display element is guided to the wearer via said visor or combiner so that a virtual image of an object to be observed is formed in front of said wearer,
    wherein said light source apparatus is made up of a first light source for emitting light with high intensity and a second light source for emitting light with low intensity,
    wherein the head-mounted display is provided with a switching unit for switching light between the light emitted from said first light source or the light emitted from said second light source,
    wherein said display element, visor or combiner and the second light source are attached to a wearable unit worn on the head of the wearer, and
    wherein said first light source is attached to a vehicle which the wearer gets in and is connected to the wearable unit through an optical transmission path.

2. The head-mounted display according to claim 1, wherein:
    said wearable unit is provided with a night vision camera,
    said display element displays said image on the basis of a video signal from said night vision camera, and
    said first light source is removable from said wearable unit.

3. The head-mounted display according to claim 1, wherein
    said first light source is a laser light source, a halogen lamp, an ultrahigh pressure mercury tamp or a metal halide lamp, and
    said second light source is a light emitting diode or a miniature bulb.

4. The head-mounted display according to claim 1, wherein
    said first light source emits light of 3000 cd or higher, and
    said second light source emits light of 100 cd or higher and 200 cd or lower.

* * * * *